United States Patent
Owechko

(10) Patent No.: US 12,091,053 B2
(45) Date of Patent: Sep. 17, 2024

(54) METHOD OF MITIGATING JAMMING OF A REFLECTED ENERGY RANGING SYSTEM FOR AN AUTONOMOUS VEHICLE

(71) Applicant: GM Global Technology Operations LLC, Detroit, MI (US)

(72) Inventor: Yuri Owechko, Newbury Park, CA (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 398 days.

(21) Appl. No.: 17/556,035

(22) Filed: Dec. 20, 2021

(65) Prior Publication Data
US 2023/0192140 A1 Jun. 22, 2023

(51) Int. Cl.
*B60W 60/00* (2020.01)
*H04W 4/40* (2018.01)

(52) U.S. Cl.
CPC .............. *B60W 60/00188* (2020.02); *B60W 60/00186* (2020.02); *H04W 4/40* (2018.02); *B60W 2420/408* (2024.01)

(58) Field of Classification Search
CPC ..... B60W 60/00188; B60W 60/00186; B60W 2420/408; H04W 4/40
See application file for complete search history.

(56) References Cited

U.S. PATENT DOCUMENTS 10,726,311 B2   7/2020  Owechko
2016/0341814 A1* 11/2016 Nguyen ............ H04L 25/03305

OTHER PUBLICATIONS

Patole et al., "Automotive Radars: A Review of Signal Processing Techniques," IEEE Sig. Proc. Ag., Mar. 2017 (Year: 2017).*
Patole et al., "Automotive Radars: A Review of Signal Processing Techniques," IEEE Sig. Proc. Ag., Mar. 2017.

* cited by examiner

*Primary Examiner* — Peter M Bythrow
*Assistant Examiner* — Nazra Nur Waheed
(74) *Attorney, Agent, or Firm* — Vivacqua Crane, PLLC

(57) ABSTRACT

A method of mitigating jamming of a reflected energy ranging system for an autonomous vehicle is presented. The system comprises at least one transmission antenna, at least two receiving antennas, and a controller comprising a processor and a non-transitory computer-readable medium. The method comprises emitting an energy signal with the transmitter antenna, contacting a target with the energy signal, and reflecting the energy signal off the target and back towards the receiving antennas as a reflected energy signal. The method further comprises receiving a composite energy signal comprising at least the reflected energy signal and a jamming energy signal with the at least two receiving antennas, analyzing the composite energy signal with the processor to blindly extract at least the reflected energy signal and the jamming energy signal, and identifying which of at least the reflected energy signal and the jamming energy signal corresponds to the target with the processor.

18 Claims, 10 Drawing Sheets

METHOD OF MITIGATING JAMMING OF A REFLECTED ENERGY RANGING SYSTEM FOR AN AUTONOMOUS VEHICLE

INTRODUCTION

The present disclosure relates to an autonomous vehicle, and more particularly to a method of mitigating jamming of a reflected energy ranging system for an autonomous vehicle In recent years, huge improvements and advancements in autonomous vehicles have occurred. When deployed, an important safety issue for autonomous vehicles (AVs) will be mitigation of physical spoofing attacks, especially attacks that attempt to disrupt or interfere with the AV's sensor data perception subsystem by overwhelming or jamming the reflective energy ranging system consisting of a radar or lidar sensor. These spoofing attacks could cause the AV to make wrong decisions which could lead to accidents or dangerous traffic situations.

Existing approaches for automotive radar jamming mitigation are based on using programmable digital filters to filter out the jamming signal so the weaker underlying target signals can be detected. This requires the classification of a signal as a jamming signal so its frequency can then be measured and used to adapt the filter. However, in many cases it may be difficult to distinguish between a malicious jamming signal and a strong but legitimate target signal. In addition, filtering out the jammer can also block any weak targets that are close in frequency to the jammer.

Thus, there is a need for a reflected energy ranging system that addresses these issues.

SUMMARY

According to several aspects of the present disclosure, a method of mitigating jamming of a reflected energy ranging system for an autonomous vehicle is presented. The system comprises at least one transmission antenna, at least two receiving antennas, and a controller comprising at least one processor and at least one non-transitory computer-readable medium including instructions. The method comprises emitting an energy signal with the at least one transmitter antenna, contacting a target with the energy signal, and reflecting the energy signal off the target and back towards the at least two receiving antennas as a reflected energy signal. The method further comprises receiving a composite energy signal comprising at least the reflected energy signal and a jamming energy signal with the at least two receiving antennas, analyzing the composite energy signal with the processor to blindly extract at least the reflected energy signal and the jamming energy signal, and identifying which of at least the reflected energy signal and the jamming energy signal corresponds to the target with the processor.

In one aspect, the system is configured for use with radar and the energy signal is arranged as a radio wave.

In another aspect, the system is configured for use with waveform modulated lidar and the energy signal is light emitted by a laser.

In another aspect, the energy signal comprises a continuous wave.

In another aspect, analyzing the composite energy signal with the processor to blindly extract at least the reflected energy signal and the jamming energy signal is further defined as performing independent component analysis on the composite energy signal with the processor to blindly extract and separate at least the reflected energy signal and the jamming energy signal.

In another aspect, the processor comprises a matched filter receiver, and wherein identifying which of at least the reflected energy signal and the jamming energy signal corresponds to the target with the processor is further defined as processing at least the reflected energy signal and the jamming energy signal with the matched filter receiver to identify which of at least the reflected energy signal and the jamming energy signal corresponds to the target.

In another aspect, performing independent component analysis on the composite energy signal with the processor to blindly extract and separate at least the reflected energy signal and the jamming energy signal is further defined as performing independent component analysis through joint approximate diagonalization of Eigen-matrices on the composite energy signal with the processor to blindly extract and separate at least the reflected energy signal and the jamming energy signal.

In another aspect, the energy signal comprises a frequency-modulated continuous wave, with emitting the energy signal with the at least one transmitter antenna further defined as emitting the energy signal with the at least one transmitter antenna as a series of chirps comprising sinusoids that increase linearly in frequency during the chirp duration and reset for the next chirp.

In another aspect, the method further comprises organizing the chirps within the received composite energy signal into a radar tensor with the processor, after receiving the composite energy signal comprising at least the reflected energy signal and a jamming energy signal with the at least two receiving antennas.

In another aspect, the radar tensor comprises a row dimension corresponding to a fast time of the chirp relating to a sample time of the chirp, and a column dimension corresponding to a slow time of the chirp relating to time between chirps.

In another aspect, the radar tensor comprises a horizontal index of the at least two receiving antennas and a vertical index of the at least two receiving antennas for measuring an azimuth and an elevation of the target.

In another aspect, analyzing the composite energy signal with the processor to blindly extract at least the reflected energy signal and the jamming energy signal is further defined as performing canonical polyadic decomposition on the radar tensors with the processor to blindly extract at least the reflected energy signal and the jamming energy signal.

In another aspect, analyzing the composite energy signal with the processor to blindly extract at least the reflected energy signal and the jamming energy signal is further defined as performing independent component analysis of tensors on the radar tensors with the processor to blindly extract and separate at least the reflected energy signal and the jamming energy signal.

In another aspect, performing independent component analysis of tensors on the radar tensors with the processor to blindly extract and separate at least the reflected energy signal and the jamming energy signal comprises sampling each radar tensor along different dimensions, reformatting the samplings into one dimensional signals, and separating the one-dimensional signals of each radar tensor into a set of tensor mode factors.

In another aspect, identifying which of at least the reflected energy signal and the jamming energy signal corresponds to the target with the processor further comprises analyzing the tensor mode factors to assign a point target corresponding to each of the reflected energy signal and the jamming energy signal.

In another aspect, identifying which of at least the reflected energy signal and the jamming energy signal corresponds to the target with the processor further comprises determining a signal amplitude for each of the point targets.

In another aspect, identifying which of at least the reflected energy signal and the jamming energy signal corresponds to the target with the processor further comprises comparing the signal amplitudes of each of the point targets with a large amplitude corresponding to the jamming energy signal.

In another aspect, the method further comprises performing a fast Fourier transform on the reflected energy signal to determine a range to the target, an angle to the target, and a velocity of the target.

According to several aspects of the present disclosure, a method of mitigating jamming of a reflected energy ranging system for an autonomous vehicle is presented. The system is arranged for use with one of radar and waveform modulated lidar and comprises at least one transmission antenna, at least two receiving antennas, and a controller comprising at least one processor and at least one non-transitory computer-readable medium including instructions. The method comprises emitting an energy signal in a continuous wave with the at least one transmitter antenna arranged as one of a radio wave and a light emitted by a laser, contacting a target with the energy signal, and reflecting the energy signal off the target and back towards the at least two receiving antennas as a reflected energy signal. The method further comprises receiving a composite energy signal comprising at least the reflected energy signal and a jamming energy signal with the at least two receiving antennas, performing independent component analysis on the composite energy signal with the processor to blindly extract and separate at least the reflected energy signal and the jamming energy signal, and identifying which of at least the reflected energy signal and the jamming energy signal corresponds to the target with the processor.

According to several aspects of the present disclosure, a method of mitigating jamming of a reflected energy ranging system for an autonomous vehicle is presented. The system is arranged for use with one of radar and waveform modulated lidar and comprises at least one transmission antenna, at least two receiving antennas, and a controller comprising at least one processor and at least one non-transitory computer-readable medium including instructions. The method comprises emitting an energy signal in a frequency-modulated continuous wave with the at least one transmitter antenna as a series of chirps comprising sinusoids that increase linearly in frequency during the chirp duration and reset for the next chirp, with the energy signal arranged as one of a radio wave and a light emitted by a laser, contacting a target with the energy signal, and reflecting the energy signal off the target and back towards the at least two receiving antennas as a reflected energy signal. The method further comprises receiving a composite energy signal comprising at least the reflected energy signal and a jamming energy signal with the at least two receiving antennas, organizing the chirps within the received composite energy signal into a radar tensor with the processor, analyzing the composite energy signal with the processor to blindly extract at least the reflected energy signal and the jamming energy signal, and identifying which of at least the reflected energy signal and the jamming energy signal corresponds to the target with the processor.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
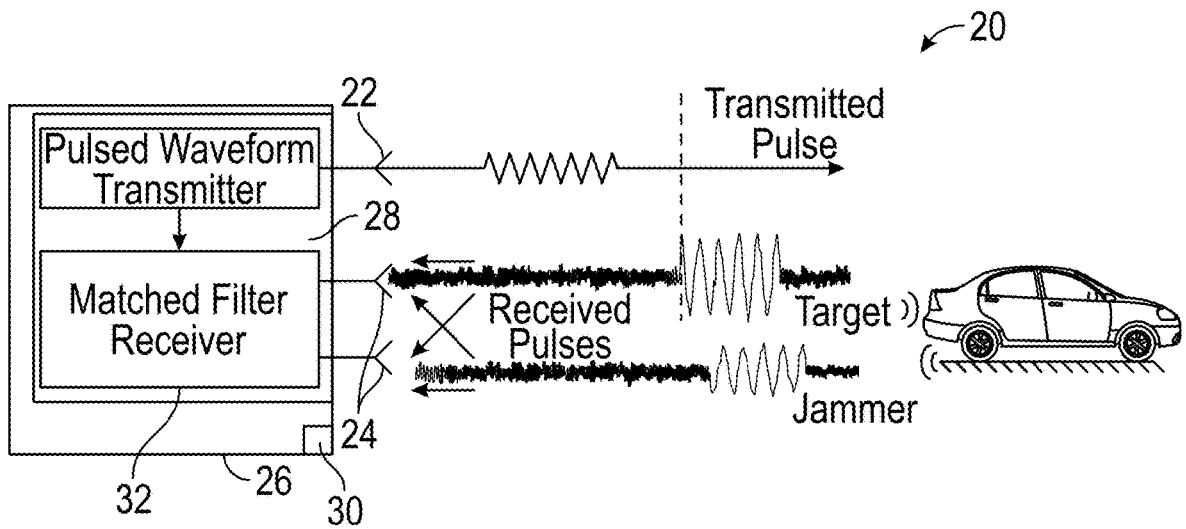
FIG. 1 is a schematic view showing one example of a reflected energy ranging system.

Referring to FIG. 1, according to several aspects of the present disclosure, a method of mitigating jamming of a reflected energy ranging system 20 for an autonomous vehicle is presented. The system 20 comprises at least one transmission antenna 22, at least two receiving antennas 24, and a controller 26 comprising at least one processor 28 and at least one non-transitory computer-readable medium 30 including instructions. The at least one non-transitory computer-readable medium 30 may include other data such as control logic, software applications, instructions, computer code, data, lookup tables, etc. A computer readable medium includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. The non-transitory computer readable medium 28 may include media where data can be permanently stored and media where data can be stored and later overwritten, such as a rewritable optical disc or an erasable memory device. Computer code includes any type of program code, including source code, object code, and executable code. The processor 28 is configured to execute the code or instructions. The at least one processor 28 may comprise a single processor 28. Alternatively, numerous processors may be utilized, including (but not limited to) a vehicle context manager, a vehicle attention manager, and a decision-making processor.

The system 20 utilizes the statistical independence of signals to mitigate the effects of intentional or un-intentional jamming of both pulsed CW (continuous wave) and FMCW (frequency-modulated continuous wave) radar and lidar sensors. Although the system 20 is generally discussed below in terms of radar, it is to be appreciated that the teachings are directly applicable to lidar which utilizes modulated pulses. Furthermore, the system 20 may be utilized with any energy source that is emitted towards a target and reflected from the target back to the system 20 to determine range.

FIG. 1 shows a diagram of the system 20 demonstrating pulsed CW automotive radar for measuring range. The transmission antenna 22 emits a short pulse of a CW or sinusoidal waveform. Any pulse reflections from an object or target are received by the receiving antennas 24 and matched coherently with a copy of the emitted pulse, resulting in a correlation peak whose delay time relative to the emission time of the pulse is used to estimate the range of the target. In addition to the reflected pulse from the target, another object or active jammer is present in the diagram, which results in another received pulse that is close in range to the target. This jammer pulse may be similar in strength to the target if it is caused by an accidental reflection of a pulse from another radar or it may be much stronger if it is actively emitted by a hostile jammer in order to degrade the radar performance. Radar systems depend on the relatively low probability of overlap in time, angle, and Doppler shift between pulses from different radars to avoid accidental jamming. However, a hostile active jammer can synchronize its emissions with the host radar to greatly increase the probability of overlap and overwhelm the host receiver with strong direct-path jamming pulses, causing the target to not be detected. The system 20 in FIG. 2 utilizes the statistical independence of the pulse waveforms from the target and the jammer to separate the target and jamming signals and enable detection of the target even if its reflected pulse overlaps in time, angle, and Doppler shift with the jammer pulse.

Automotive radars typically have an antenna array comprising the receiving antennas 24, in order to estimate the azimuth and elevation angles of targets. The receiving antennas 24 will both receive the target and jammer pulses, forming different mixtures of the signals. The processor 28 may utilize independent component analysis (ICA) to blindly extract the components of multiple mixtures by using algorithms to maximize the statistical independence of multiple outputs, which results in the components appearing separately in the outputs. In the case of a hostile active and adaptive jammer, both the target and jammer return pulses can arrive at close to the same angle. The system 20 in FIG. 2 mitigates strong jammer pulses that have virtually the same delay time and angle of arrival as the target reflected pulses by utilizing the fact that even small differences in the Doppler frequencies of sinusoid waveforms due to very small differences in the target and jammer velocities can make them statistically independent and separable using ICA.

Figure 2:
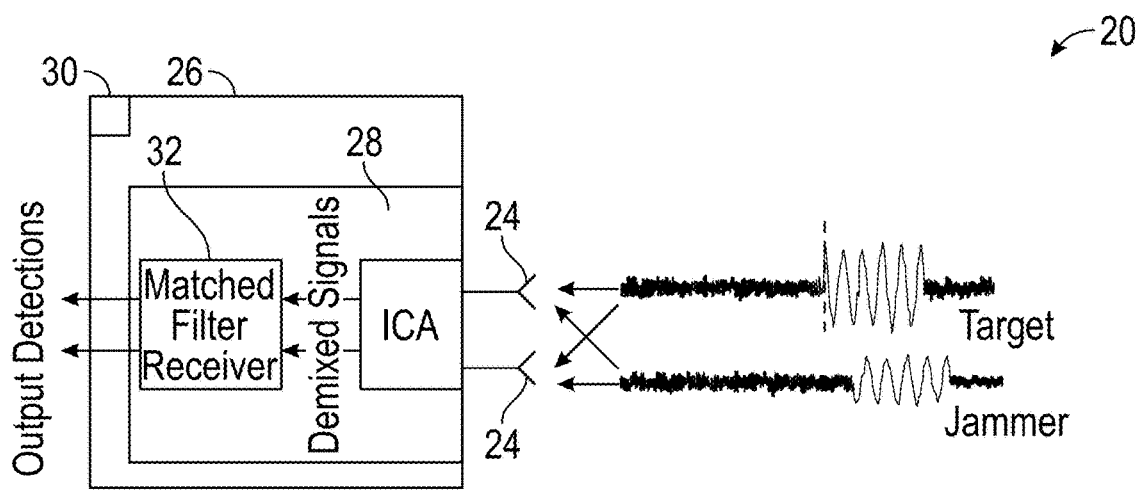
FIG. 2 is a schematic view showing another example of a reflected energy ranging system.

FIG. 2 shows an example of the system 20 utilizing ICA-based jamming mitigation for pulsed CW radar. Multiple signal mixtures from the receiving antennas 24 are processed by the processor 28 using ICA to produce multiple outputs of demixed signals. The jammer signal and legitimate target signals will appear on separate output ports. Each demixed output signal is then processed using a matched filter receiver 32 to estimate the ranges of the targets and jammer.

Figure 3:
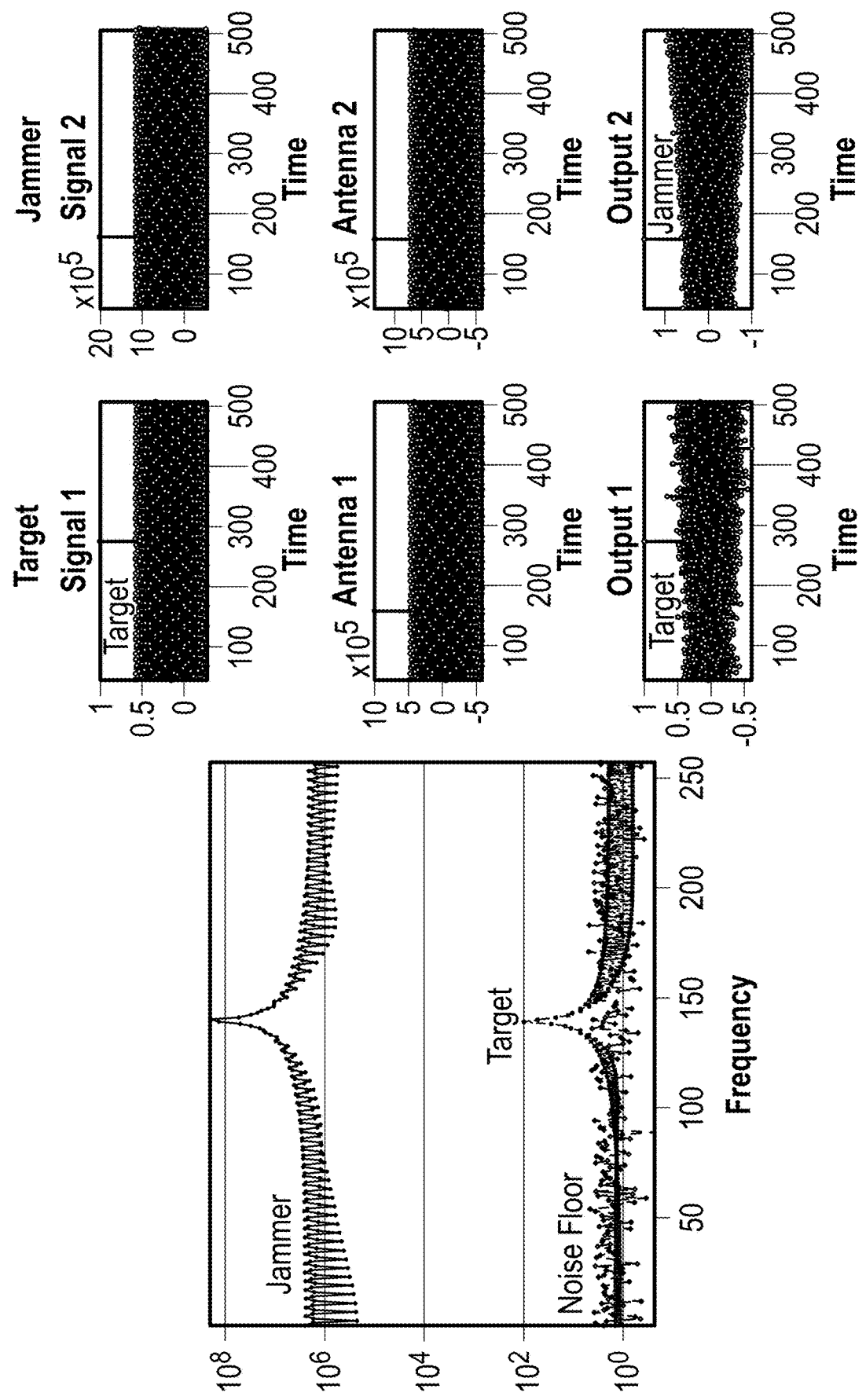
FIG. 3 is collection of graphs showing one example of separating a reflected energy signal and a jamming energy signal using independent component analysis.
Figure 4:
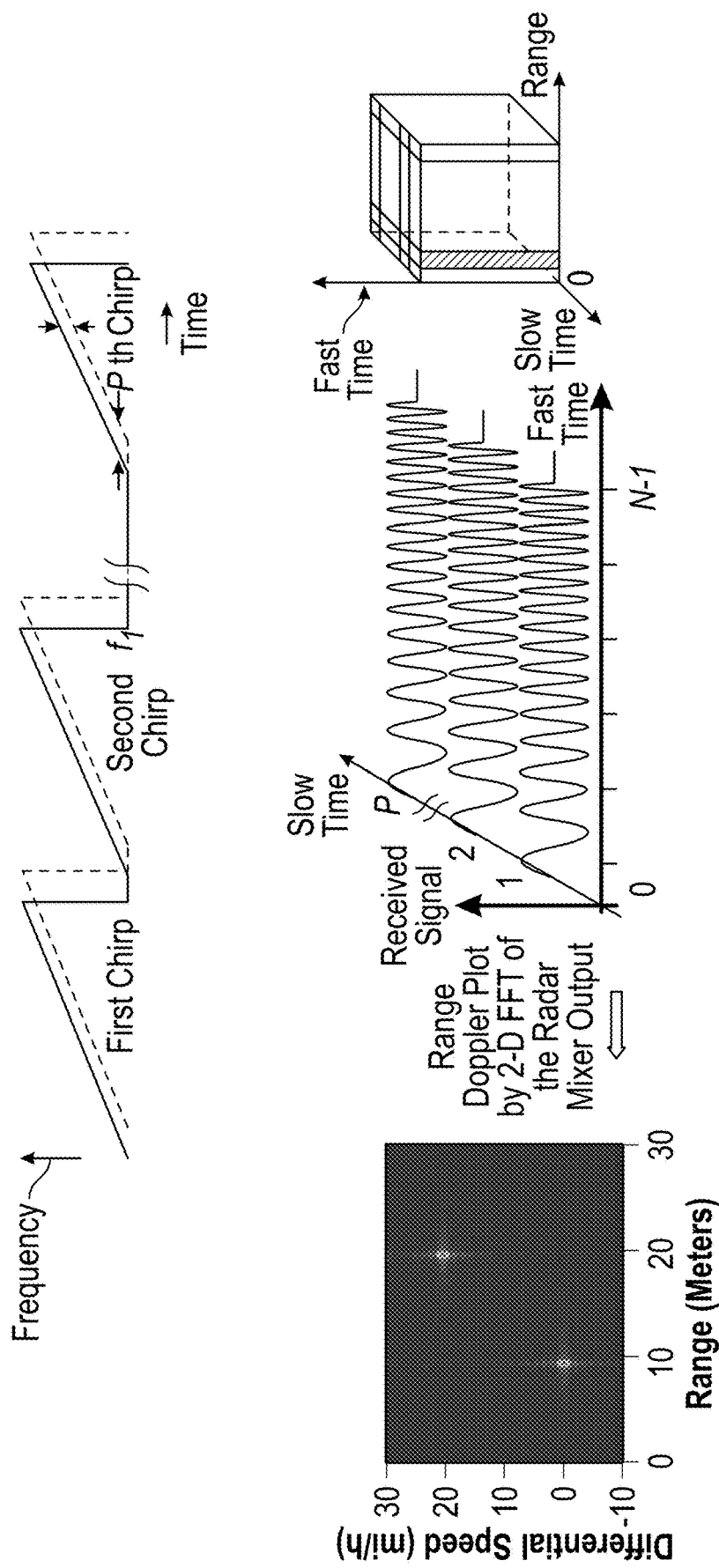
FIG. 4 is a collection of graphs showing processing of frequency-modulated continuous wave radar.

FIG. 3 shows results for simulations of CW pulse radar jamming mitigation using ICA processing with the two receiving antennas 24. In this example, the jamming energy signal was a factor of 1 million or 120 db stronger than the reflected energy signal. Both signals consisted of 500 time-samples and differed by only 0.2% in frequency (equal to the fast-Fourier transform (FFT) frequency resolution for 500-sample signals). Noise was added to the signal mixtures. As show in the spectrum plot on the left of FIG. 3, the target and jammer signals were 20 db and 140 dB above the noise floor. Time domain plots are shown on the right for ground truth signals, antenna mixture signals, and ICA output signals (a single delta function spike at different time positions was added to each of the signals to better distinguish the signals in the plots.) The two antenna mixture signals appear identical because the target signal is much weaker than the jamming energy signal. The ICA method was able to successfully separate the target and jammer. The maximum jammer power that could be handled is limited only by the noise floor and the numerical precision requirements of the ICA algorithm, in this case JADE (Joint Approximate Diagonalization of Eigen-matrices). Unlike some other ICA algorithms, JADE is not based on gradient descent and is therefore robust against significant differences in the strengths of components in the mixtures. However, any suitable ICA algorithm may be utilized.

Figure 5:
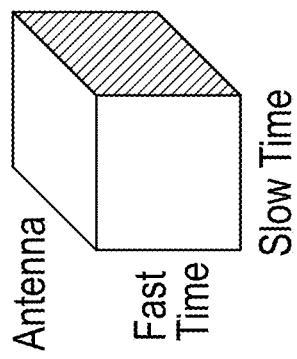
FIG. 5 is schematic view of a radar tensor.

FIGS. 4 to 7 show an algorithm for analyzing FMCW radar signals in order to mitigate jamming. Instead of utilizing pulsed CW waveforms, FMCW waveforms consist of a series of "chirps" or pulses consisting of sinusoids that increase linearly in frequency during the pulse duration and then reset for the next pulse. FMCW radar may measure the range and velocity of targets simultaneously using a single receiving antenna 24. The azimuth and elevation angles of targets can also be measured using two or more receiving antennas 24. After down-conversion by mixing with a reference chirp signal derived from the emitted pulses, the received chirps are organized into a radar tensor or 3D/4D data array, as shown in FIG. 5. Each chirp forms a row of the tensor in "fast time" where the time increments are the chirp sample times. The chirps are stacked in the column dimension in "slow time" where the time increments correspond to the time between chirps (see FIG. 4). The third and optionally fourth dimensions of the tensor correspond to horizontal and vertical indices of an antenna array (i.e., two or more receiving antennas 24) for measuring the azimuth and elevation of targets. A point target for the radar tensor consists of an outer product of sinusoidal signals in each of the dimensions and the products add linearly to form the data tensor. In other words, the tensor is separable into a set of factor tensors that form the original tensor when added together. Each factor corresponds to a point target. By performing a 3-dimensional FFT of the radar tensor, the angle, Doppler shift or velocity, and range of each point target can be determined from the indices of the peaks in the processed tensor.

Figure 6:
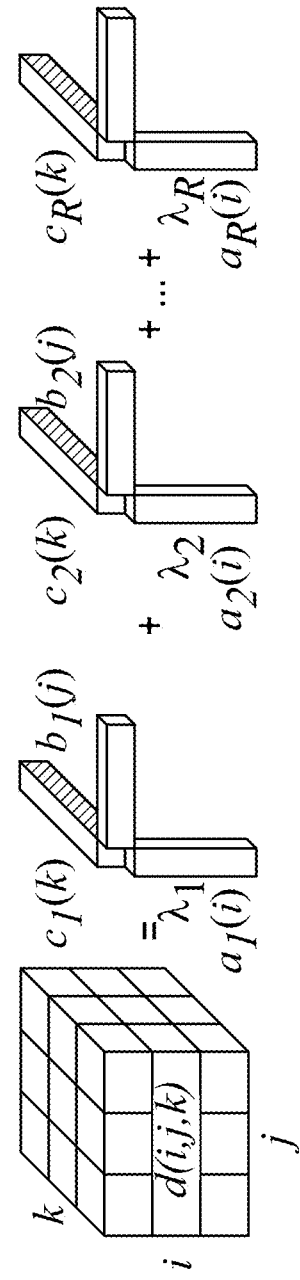
FIG. 6 is schematic view showing decomposition of the radar tensor using canonical polyadic decomposition (CPD).

FIG. 6 shows the factorization of an example of a radar tensor (illustrated graphically). Each tensor factor, which represents a point target, consists of an outer-product of vectors corresponding to the antenna, slow time, and fast time dimensions. This sum of outer-products is a tensor decomposition known as Canonical Polyadic Decomposition (CPD). CPD can greatly reduce the number of parameters needed to define a tensor by taking advantage of patterns and structure in the tensor. Due to the linearity of the FFT, the CPD factors in angle-doppler-range space can be calculated by applying FFTs to the individual mode vectors in each factor. Since each radar tensor factor corresponds to a different point target, CPD is used before or after the FFT to separate the target signals from the jamming signals in order to counter jamming of FMCW radars.

Figure 7:
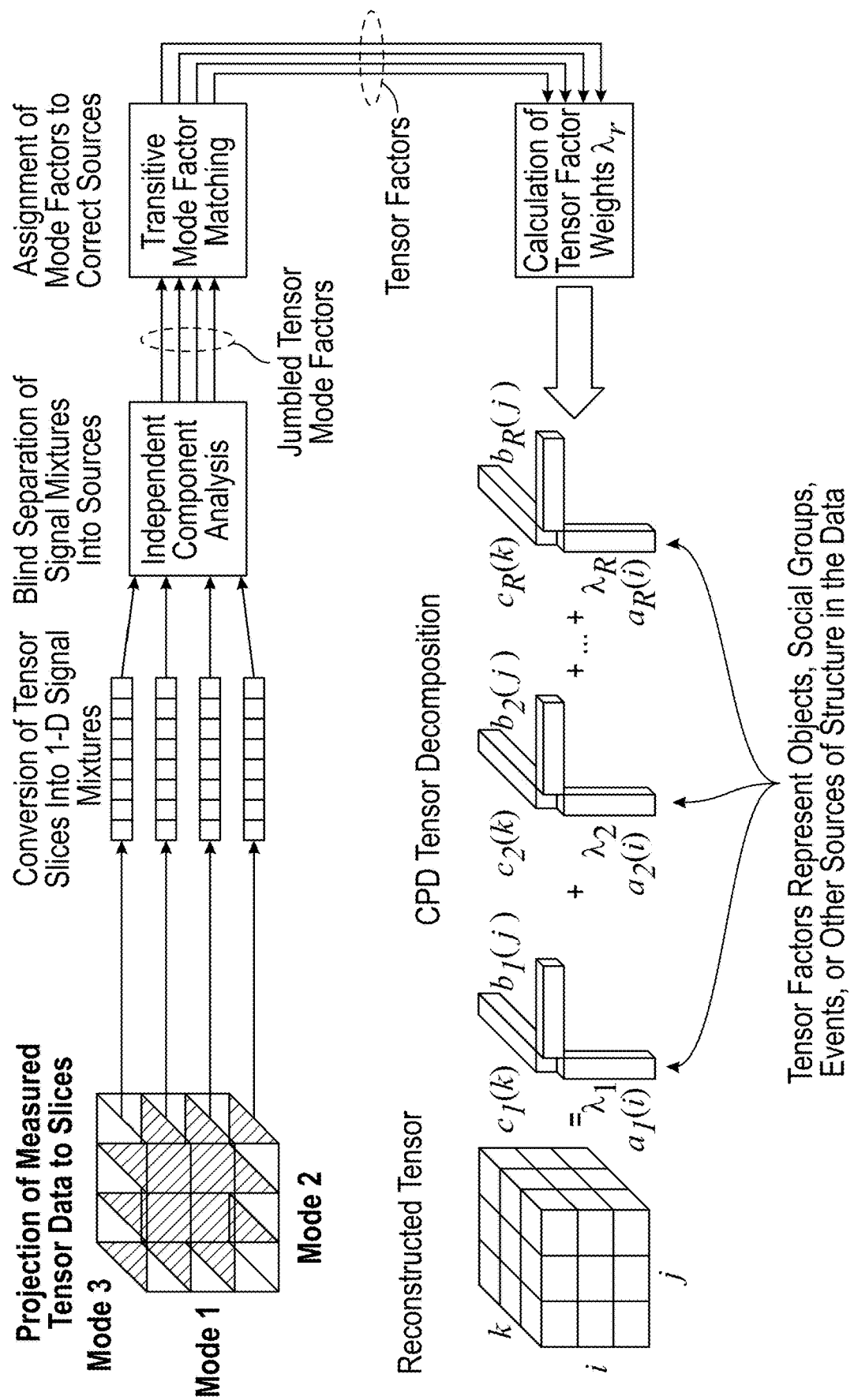
FIG. 7 is a schematic view of a process flow for decomposition of the radar tensor into CPD factors using Independent Component Analysis of Tensors (ICAT).

Alternatively, Independent Component Analysis of Tensors (ICAT), which utilizes signal processing and tensor subsampling, may be utilized. ICAT tensor decomposition is illustrated in FIG. 7. The input tensor is subsampled using "slices" along different dimensions which are reformatted into 1-D signals. Such the slices sample only a fraction of the tensor, the full tensor never needs to be represented in memory. ICA is used to separate each set of slices into a set of tensor mode factors. Since the ordering of ICA outputs is ambiguous, transitive mode factor matching is used to assign the mode factors for different dimensions to the correct combinations to reconstruct the original tensor.

ICAT uses ICA to blindly demix or separate tensor components by maximizing statistical independence instead of fitting a model to the data. ICA demixing does not require accurate specification of the number of factors beforehand as existing tensor decomposition methods do which results in ICAT being more robust. Since ICAT does not utilize gradient-descent, it is better at detecting weak signals since the gradient component for weak signals can be overwhelmed by strong jammers. ICA, on the other hand, is not affected by significant differences in factor strengths as long as the factors are above the noise floor and numerical precision requirements are met.

Figure 8:
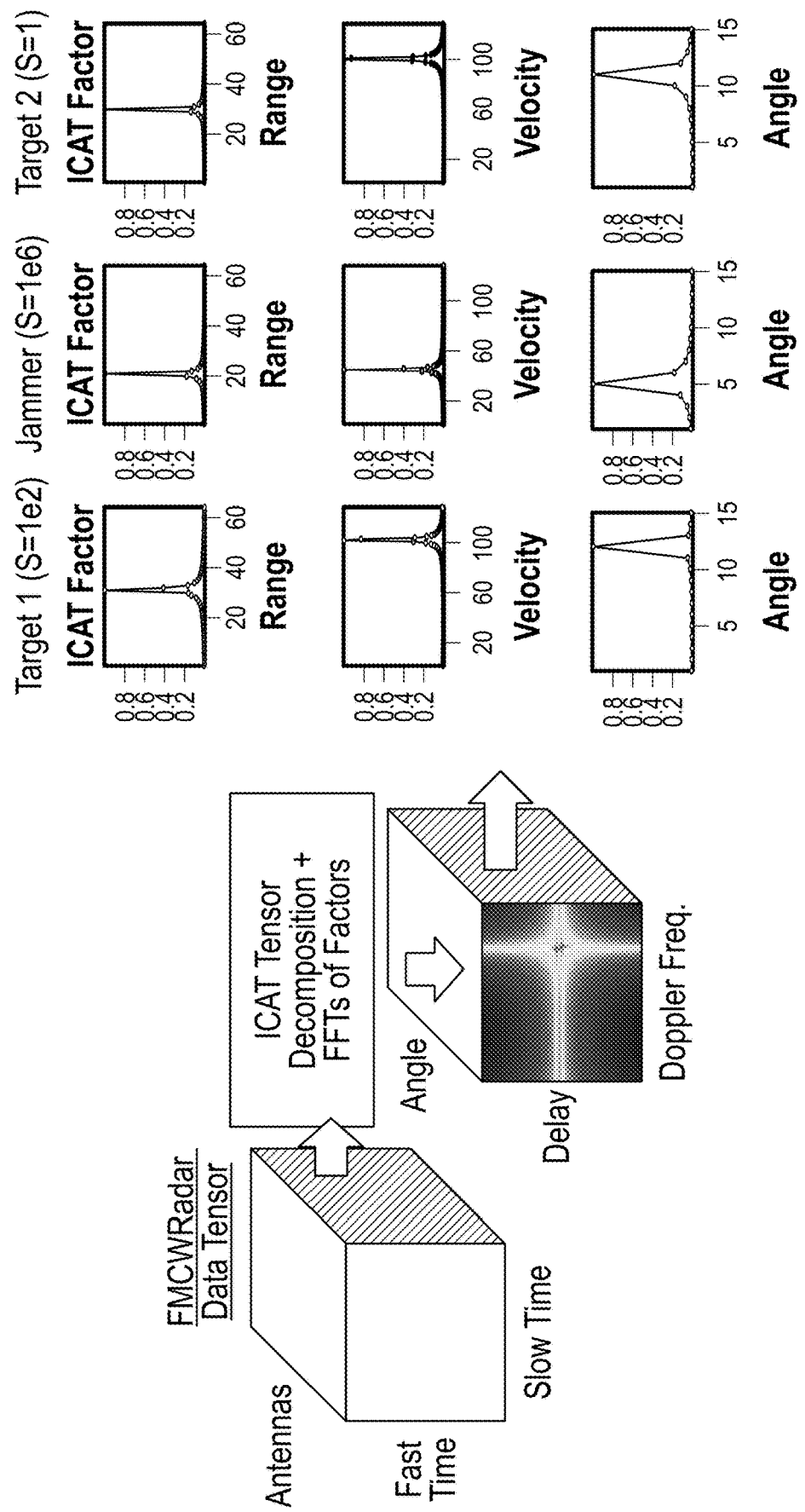
FIG. 8 is a schematic view demonstrating radar jamming mitigation using ICAT decomposition of the radar tensor and using fast-Fourier transform of the decomposed radar tensor, and showing the extracted target and jammer point targets.

Simulation results for ICAT jamming mitigation using an input radar tensor with fast time, slow time, and antenna index dimensions are shown in FIG. 8. The dataset consists of three point targets. Two of the points are set as targets with relative signal amplitudes of 1 and 100. The third point is designated to be the jammer with a relative amplitude of 1 million. ICAT tensor decomposition was performed in this pre-FFT domain where each point target is represented by a sine wave in the three dimensions or modes of the tensor. The tensor factors demixed by ICAT were then transformed using FFTs to generate the results shown in the range-velocity-angle domain. On the right of FIG. 8, the columns correspond to the targets and jammer while the rows are the tensor mode vectors in the range, velocity, and angle dimensions.

Figure 9A:
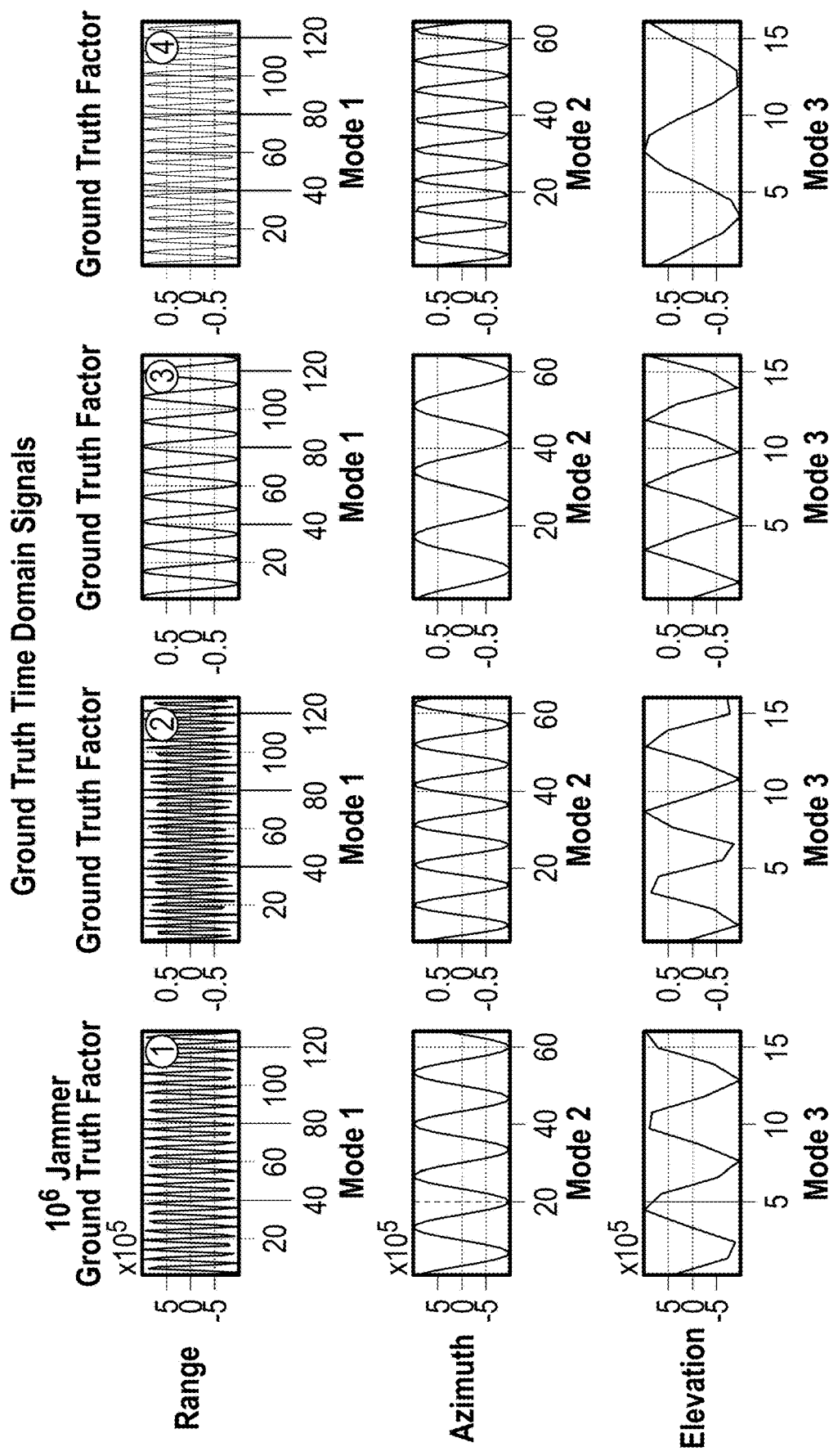
FIGS. 9A and 9B are collections of graphs showing results of a simulation of ICAT jamming mitigation for four FMCW point targets with random range, azimuth, and elevation values.
Figure 9B:
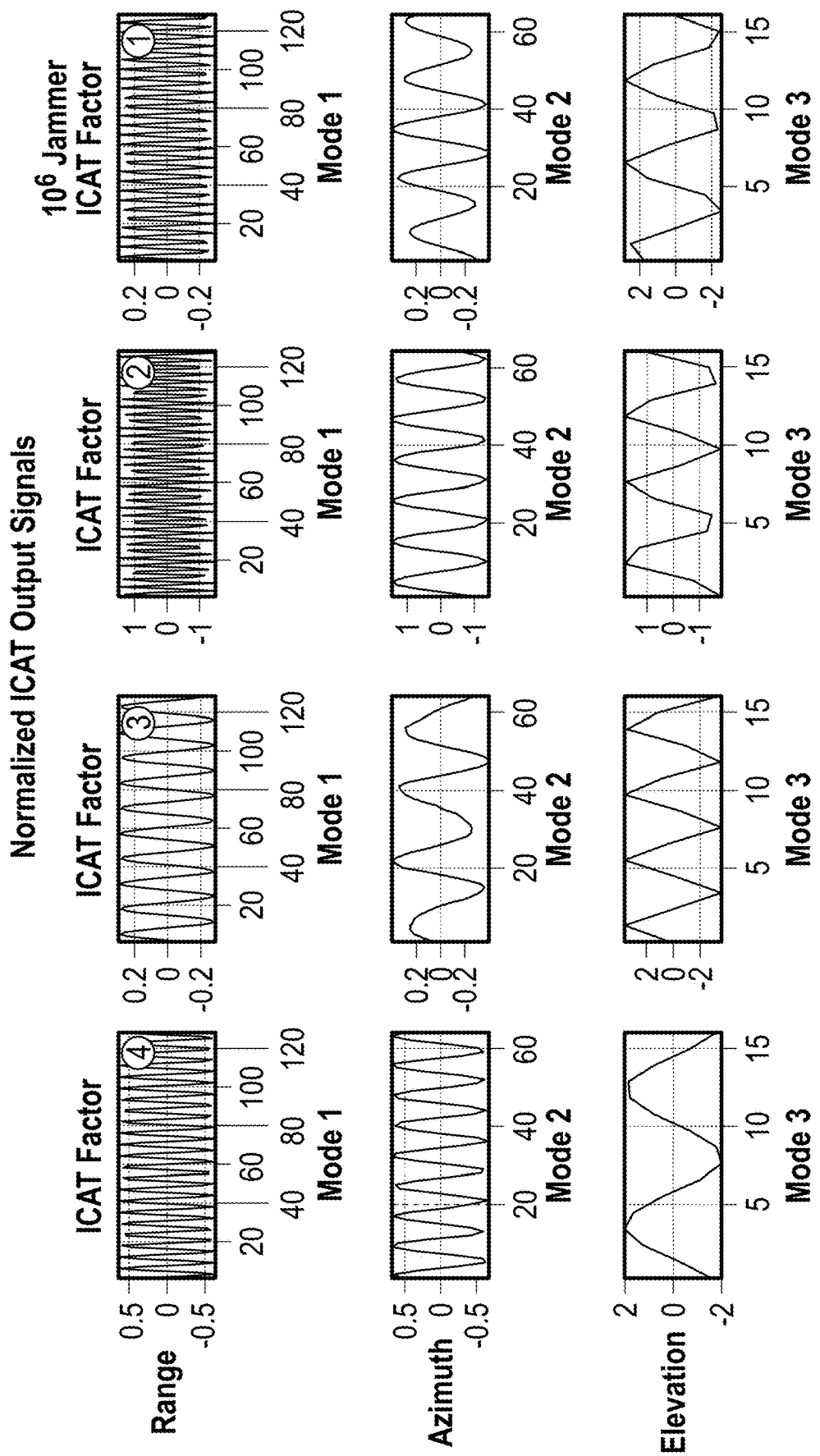
Figure 10A:
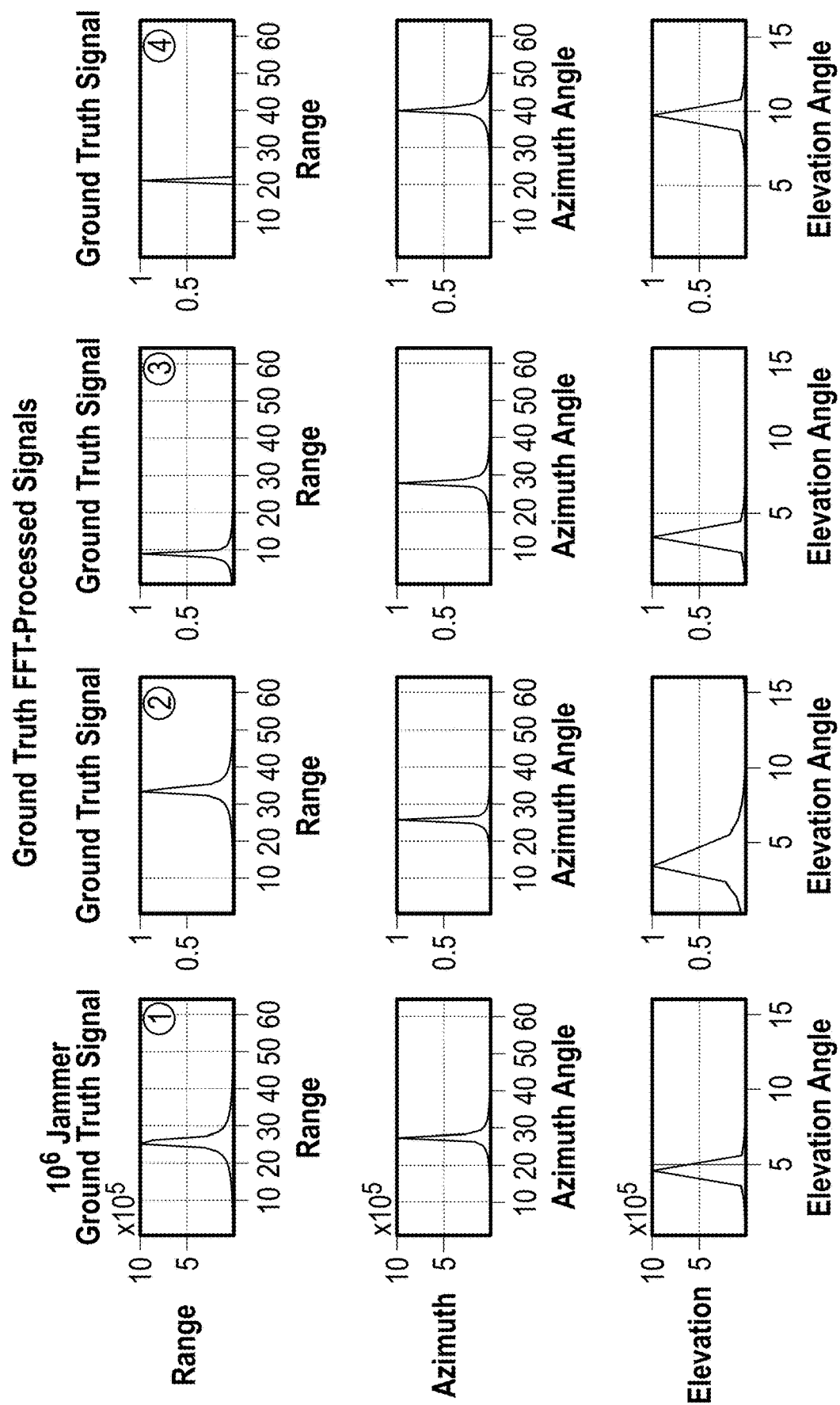
FIGS. 10A and 10B are collections of graphs showing results of a fast-Fourier transform of the outputs in FIGS. 9A and 9B to transform the outputs into range, azimuth, and elevation dimensions.
Figure 10B:
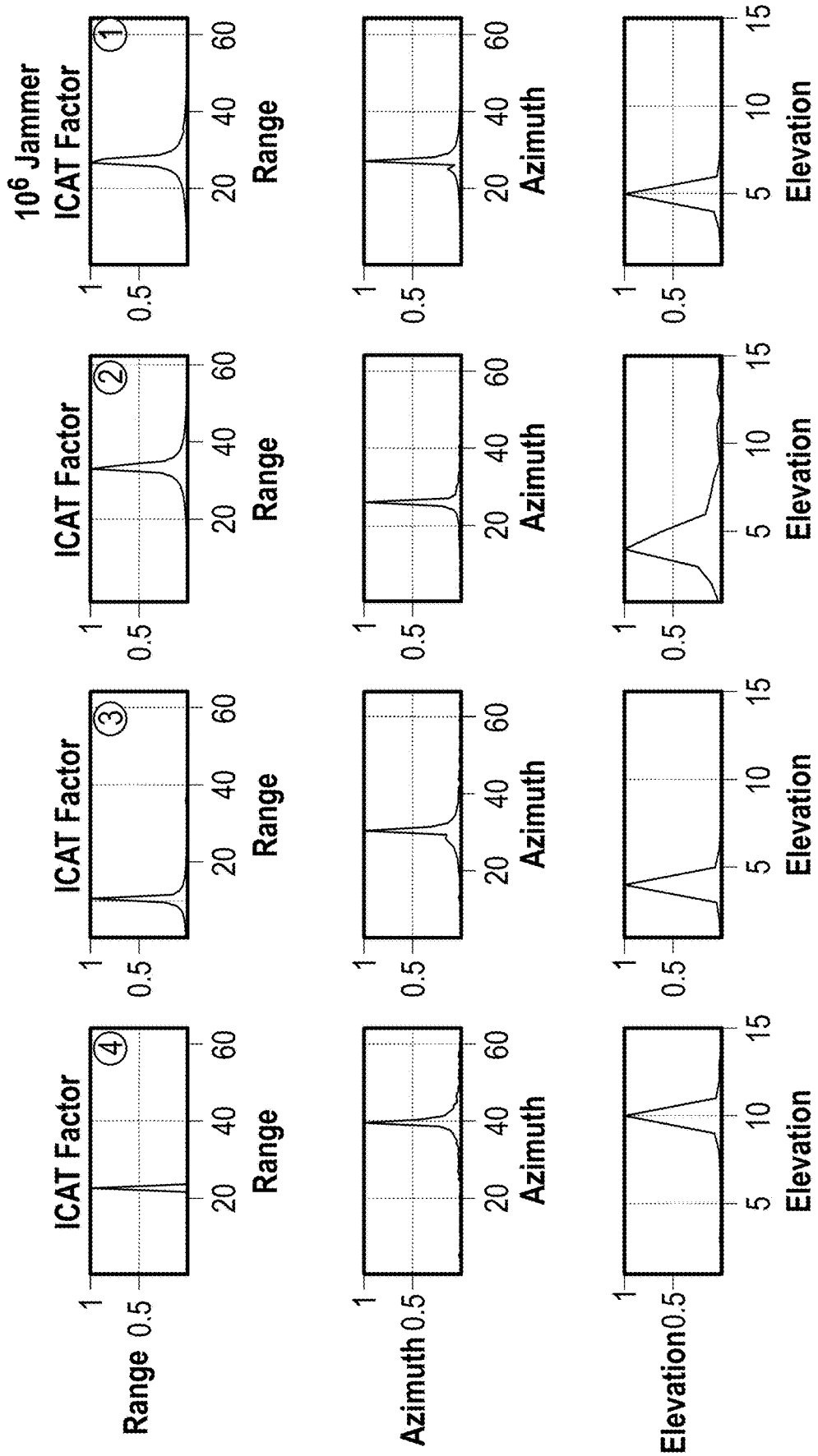

Results of a simulation of ICAT jamming mitigation for 4 FMCW point targets with random range, azimuth, and elevation values are shown in FIGS. 9A, 9B, 10A and 10B. Columns correspond to the four point targets. Three of the points were targets with relative amplitudes of 1 while the fourth point was the jammer with an amplitude of 1 million. In FIGS. 9A and 9B the data is shown before the FFTs are applied so each signal is sinusoidal. FIG. 9A shows the ground-truth for the individual point targets while FIG. 9B shows the output of ICAT. The jammer and three weak targets were extracted with good quality despite interference from the strong jammer. FIGS. 10A and 10B show the ground-truth and ICAT outputs for the one million jammer simulation scenario in FIGS. 9A and 9B after FFTs were applied to each mode in order to transform into range, azimuth, and elevation dimensions.

Accordingly, the method of mitigating jamming of the reflected energy ranging system 20 offer several advantages. Target FMCW radar signals can be extracted from underneath strong jamming signals that cover the target signals in the range, Doppler frequency, and angle dimensions. Furthermore, because the jamming mitigation is based on the statistical independence of the target and jamming radar signals, it is limited not by the relative strength of the jammer but by the sensor noise level and the numerical precision of the calculations. In addition, the method may be used on CW as well as FMCW or pulsed radar signals.

The description of the present disclosure is merely exemplary in nature and variations that do not depart from the general sense of the present disclosure are intended to be within the scope of the present disclosure. Such variations are not to be regarded as a departure from the spirit and scope of the present disclosure.

What is claimed is:

1. A method of mitigating jamming of a reflected energy ranging system for an autonomous vehicle, with the system comprising at least one transmitter antenna, at least two receiving antennas, and a controller comprising at least one processor and at least one non-transitory computer-readable medium including instructions, the method comprising:
   emitting an energy signal with the at least one transmitter antenna, wherein the energy signal comprises a continuous wave;
   contacting a target with the energy signal;
   reflecting the energy signal off the target and back towards the at least two receiving antennas as a reflected energy signal;
   receiving a composite energy signal comprising at least the reflected energy signal and a jamming energy signal with the at least two receiving antennas;
   analyzing the composite energy signal with the processor to extract at least the reflected energy signal and the jamming energy signal by performing independent component analysis on the composite energy signal with the processor to extract and separate at least the reflected energy signal and the jamming energy signal; and
   identifying which of at least the reflected energy signal and the jamming energy signal corresponds to the target with the processor.

2. The method of claim 1, wherein the system is configured for use with radar and the energy signal is arranged as a radio wave.

3. The method of claim 1, wherein the system is configured for use with waveform modulated lidar and the energy signal is light emitted by a laser.

4. The method of claim 1, wherein the processor comprises a matched filter receiver, and wherein identifying which of at least the reflected energy signal and the jamming energy signal corresponds to the target with the processor is further defined as processing at least the reflected energy signal and the jamming energy signal with the matched filter receiver to identify which of at least the reflected energy signal and the jamming energy signal corresponds to the target.

5. The method of claim 1, wherein performing independent component analysis on the composite energy signal with the processor to extract and separate at least the reflected energy signal and the jamming energy signal is further defined as performing independent component analysis through joint approximate diagonalization of Eigen-matrices on the composite energy signal with the processor to extract and separate at least the reflected energy signal and the jamming energy signal.

6. The method of claim 1, wherein the energy signal additionally includes a frequency-modulated continuous wave, with emitting the energy signal with the at least one transmitter antenna further defined as emitting the energy signal with the at least one transmitter antenna as a series of chirps comprising sinusoids that increase linearly in frequency during the chirp duration and reset for the next chirp.

7. The method of claim 6, further comprising organizing the chirps within the received composite energy signal into a radar tensor with the processor, after receiving the composite energy signal comprising at least the reflected energy signal and the jamming energy signal with the at least two receiving antennas.

8. The method of claim 7, wherein the radar tensor comprises a row dimension corresponding to a fast time of the chirp relating to a sample time of the chirp, and a column dimension corresponding to a slow time of the chirp relating to time between chirps.

9. The method of claim 8, wherein the radar tensor comprises a horizontal index of the at least two receiving antennas and a vertical index of the at least two receiving antennas for measuring an azimuth and an elevation of the target.

10. The method of claim 7, wherein analyzing the composite energy signal with the processor to extract at least the reflected energy signal and the jamming energy signal is further defined as performing canonical polyadic decomposition on the radar tensor with the processor to extract at least the reflected energy signal and the jamming energy signal.

11. The method of claim 7, wherein analyzing the composite energy signal with the processor to extract at least the reflected energy signal and the jamming energy signal is further defined as performing independent component analysis of tensors on the radar tensor with the processor to extract and separate at least the reflected energy signal and the jamming energy signal.

12. The method of claim 11, wherein performing independent component analysis of tensors on the radar tensor with the processor to extract and separate at least the reflected energy signal and the jamming energy signal comprises sampling each radar tensor along different dimensions, reformatting the samplings into one dimensional signals, and separating the one-dimensional signals of each radar tensor into a set of tensor mode factors.

13. The method of claim 12, wherein identifying which of at least the reflected energy signal and the jamming energy signal corresponds to the target with the processor further comprises analyzing the tensor mode factors to assign a point target corresponding to each of the reflected energy signal and the jamming energy signal.

14. The method of claim 13, wherein identifying which of at least the reflected energy signal and the jamming energy signal corresponds to the target with the processor further comprises determining a signal amplitude for each of the point targets.

15. The method of claim 14, wherein identifying which of at least the reflected energy signal and the jamming energy signal corresponds to the target with the processor further comprises comparing the signal amplitudes of each of the point targets with an amplitude corresponding to the jamming energy signal.

16. The method of claim 15, further comprising performing a fast Fourier transform on the reflected energy signal to determine a range to the target, an angle to the target, and a velocity of the target.

17. A method of mitigating jamming of a reflected energy ranging system for an autonomous vehicle, with the system arranged for use with one of radar and waveform modulated lidar and comprising at least one transmitter antenna, at least two receiving antennas, and a controller comprising at least one processor and at least one non-transitory computer-readable medium including instructions, the method comprising:
emitting an energy signal in a continuous wave with the at least one transmitter antenna arranged as one of a radio wave and a light emitted by a laser;
contacting a target with the energy signal;
reflecting the energy signal off the target and back towards the at least two receiving antennas as a reflected energy signal;
receiving a composite energy signal comprising at least the reflected energy signal and a jamming energy signal with the at least two receiving antennas;
performing independent component analysis on the composite energy signal with the processor to extract and separate at least the reflected energy signal and the jamming energy signal by performing independent component analysis on the composite energy signal with the processor to extract and separate at least the reflected energy signal and the jamming energy signal; and
identifying which of at least the reflected energy signal and the jamming energy signal corresponds to the target with the processor.

18. A method of mitigating jamming of a reflected energy ranging system for an autonomous vehicle, with the system arranged for use with one of radar and waveform modulated lidar and comprising at least one transmitter antenna, at least two receiving antennas, and a controller comprising at least one processor and at least one non-transitory computer-readable medium including instructions, the method comprising:
emitting an energy signal in a frequency-modulated continuous wave with the at least one transmitter antenna as a series of chirps comprising sinusoids that increase linearly in frequency during the chirp duration and reset for the next chirp, with the energy signal arranged as one of a radio wave and a light emitted by a laser;
contacting a target with the energy signal;
reflecting the energy signal off the target and back towards the at least two receiving antennas as a reflected energy signal;
receiving a composite energy signal comprising at least the reflected energy signal and a jamming energy signal with the at least two receiving antennas;
organizing the chirps within the received composite energy signal into a radar tensor with the processor;
analyzing the composite energy signal with the processor to extract at least the reflected energy signal and the jamming energy signal; and
identifying which of at least the reflected energy signal and the jamming energy signal corresponds to the target with the processor by performing canonical polyadic decomposition on the radar tensor with the processor to extract at least the reflected energy signal and the jamming energy signal.

* * * * *